UNITED STATES PATENT OFFICE.

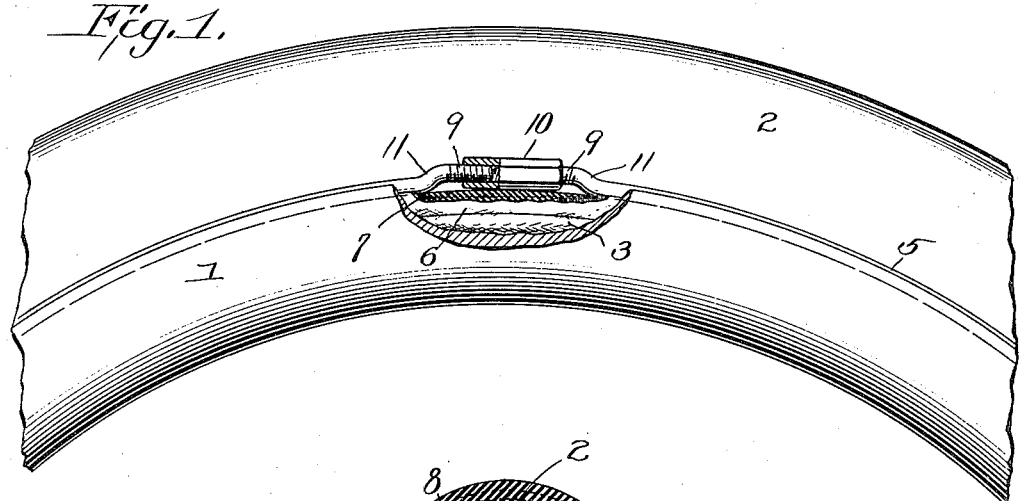
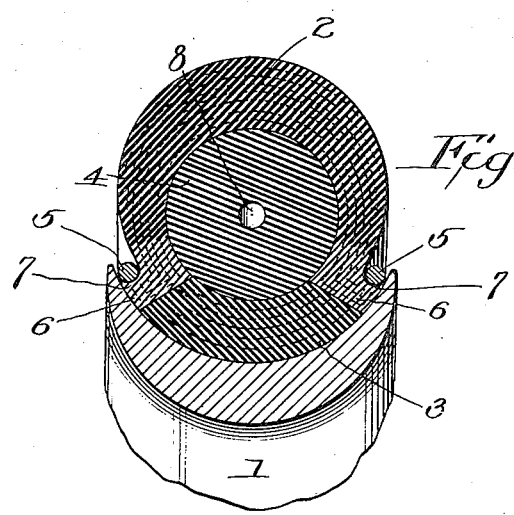
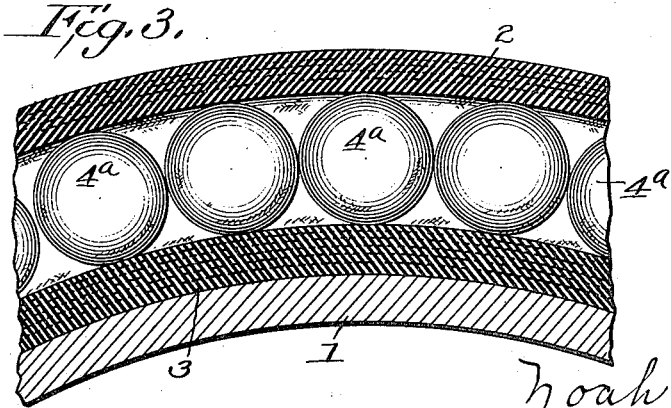

NOAH HARRIS, OF INDIANAPOLIS, INDIANA.

RESILIENT TIRE.

1,024,336.      Specification of Letters Patent.      Patented Apr. 23, 1912.

Application filed November 23, 1910. Serial No. 593,821.

*To all whom it may concern:*

Be it known that I, NOAH HARRIS, a citizen of the United States, residing at Indianapolis, in the county of Marion and State of Indiana, have invented new and useful Improvements in Resilient Tires, of which the following is a specification.

My present invention has to do with resilient tires for bicycles and other vehicle wheels; and it consists in the peculiar and advantageous tire hereinafter described and claimed.

In the drawings which are hereby made part hereof: Figure 1 is a side elevation, partly in section, of a portion of a tire constructed in accordance with my invention. Fig. 2 is a transverse section of the same. Fig. 3 is a view, partly in longitudinal section and partly in elevation, illustrative of a modification hereinafter specifically referred to.

Referring by numeral to the drawings, and more particularly to Figs. 1 and 2 thereof:

1 is a wheel rim the periphery of which is concave in cross-section.

2 is the cover of the tire, 3 is a cover support which surrounds the rim 1.

4 is a core of rubber or other suitable resilient material which surrounds the cover support 3 and constitutes the cushioning means of the embodiment shown in Figs. 1 and 2, and 5 5 are hoops which have for their office to hold the edges of the cover in working position against the opposed edges of the support 3.

As will be observed by reference to Fig. 2, the edge portions 6 of the cover 2 are of increased width, and are provided in the backs of their outwardly extended portions with seats 7 of concave form in cross-section designed to receive the hoops 5 in the manner shown in Fig. 2. The cover 2 is preferably formed of rubber, fibrous material and rubber cement in the manner well known in the resilient tire art, and while the major portion of the cover—*i. e.*, the portion shown by heavy hatch lines in Fig. 2, is soft and possessed of resiliency, the remainder of the cover, viz: the edge portions represented by fine hatch lines in Fig. 2, are vulcanized or otherwise made hard, this in order to enable the hard edge portions 6 to afford a strong hold for the hoops 5, so that the liability of said edge portions working or being pulled out of engagement with the hoops, is reduced to a minimum.

The edge portions 6 of cover 2 are arranged in and supported by the wheel rim 1, and are made to abut against the opposed edges of the cover support 3. This support 3 is preferably composed of the same material as the major portion of the cover 2, and in any event is made so that it is possessed of resiliency, and hence it follows that the support 3 will cushion the edge portions of the cover 2 and by so doing will contribute to the resiliency of the tire as a whole.

The core 4, formed of soft rubber, is arranged against and cushioned to a certain extent by the resilient support 3, and the resiliency of the said core is preferably increased by providing it with a central bore 8. I would also have it understood that the core 4 is of a diameter to closely or snugly fill the cover 2, and that the said core is not attached to either the casing 2 or the support 3, this being advantageous since the lack of connection between the core 4 and the casing 2 or the support 3 renders the tire as a whole more resilient than would be the case if the core 4 was attached. I would also direct attention here to the fact that a puncture or cut extending through the cover or casing 2 and into the cushioning means or rubber core 4, will not diminish in any degree the resilient quality of the tire.

The hoops 5 may be of any construction consonant with the purpose of my invention without involving departure from the scope of the invention as claimed. I prefer, however, to employ hoops 5 that are identical in construction and respectively have oppositely threaded ends 9 connected through the medium of a turn-buckle 10, as shown in Fig. 1, this construction being preferable because it permits of the hoops being readily placed in and removed from position when desired. It will also be noticed by reference to Fig. 1 that when the turn-buckle 10 is employed as part of a hoop, the hoop is provided with lateral deflections 11 adjacent its threaded end portions so as to prevent the turn-buckle from interfering with the arrangement of the hoops against the concave surface of the rim 1 and in the seats 7 of the cover 2.

In practice I prefer to provide cover supports 3 of different widths, to suit rims of different widths, but in this connection I would have it understood that supports 3 of the same width will do for rims of different widths, provided the variation in width of the rims is not too great.

The modification illustrated in Fig. 3 is identical in construction with that shown in Figs. 1 and 2, with the exception that the modification does not comprise the rubber core 4, but in lieu thereof includes as a cushioning means a plurality of inflated rubber balls 4ª. These inflated rubber balls form a light and efficient means for rendering the tire as a whole highly resilient, and inasmuch as each tire will comprise considerable of the balls, it will be manifest that a puncture or cut through the cover 2 and into one of the balls will deflate that ball only, and hence will not seriously affect the inflation or resiliency of the tire as a whole.

While I have shown and described two forms of my invention, it is to be understood that I am not limited to the details or to the form or relative arrangement of parts disclosed, but that modifications may be made therein without departing from the spirit of the claimed invention.

Having described my invention, what I claim and desire to secure by Letters-Patent, is:

In a resilient tire, the combination of a troughed rim, a cover having a soft major portion and hard edge portions of increased width extending laterally outward beyond the major portion and also having the hard edge portions arranged in the troughed rim, resilient cushioning material arranged in the cover, hoops surrounding the said edge portions of the cover and arranged in the seats or grooves thereof, and a cover support formed by a solid mass of resilient material, of less width than the rim, surrounding the said rim and interposed between the edges of the cover and also interposed between the rim and the cushioning material, whereby it is adapted to form a bed or rest for said cushioning material and is also adapted to serve as an auxiliary cushion.

In testimony whereof I have hereunto set my hand in presence of two subscribing witnesses.

NOAH HARRIS.

Witnesses:
 N. L. HARRIS,
 SAMUEL OTTENBACHER.